US009330026B2

(12) United States Patent
Zeng et al.

(10) Patent No.: US 9,330,026 B2
(45) Date of Patent: May 3, 2016

(54) METHOD AND APPARATUS FOR PREVENTING UNAUTHORIZED ACCESS TO CONTENTS OF A REGISTER UNDER CERTAIN CONDITIONS WHEN PERFORMING A HARDWARE TABLE WALK (HWTW)

(71) Applicant: QUALCOMM Incorporated, San Diego, CA (US)

(72) Inventors: Thomas Zeng, San Diego, CA (US); Azzedine Touzni, San Diego, CA (US); Tzung Ren Tzeng, Santa Clara, CA (US); Phil J. Bostley, Boulder, CO (US)

(73) Assignee: QUALCOMM INCORPORATED, San Diego, CA (US)

( * ) Notice: Subject to any disclaimer, the term of this patent is extended or adjusted under 35 U.S.C. 154(b) by 374 days.

(21) Appl. No.: 13/785,979

(22) Filed: Mar. 5, 2013

(65) Prior Publication Data

US 2014/0258663 A1    Sep. 11, 2014

(51) Int. Cl.
*G06F 12/14* (2006.01)
*G06F 12/1027* (2016.01)
(Continued)

(52) U.S. Cl.
CPC .......... *G06F 12/145* (2013.01); *G06F 12/1491* (2013.01); *G06F 21/79* (2013.01); *G06F 12/1027* (2013.01); *G06F 2212/151* (2013.01); *G06F 2212/654* (2013.01)

(58) Field of Classification Search
CPC ............ G06F 12/1441; G06F 12/1475; G06F 12/1027; G06F 12/14; G06F 21/79; G06F 12/145; G06F 12/1491; G06F 2212/151; G06F 2212/654
USPC ...................... 711/163, 203, 205, 206, 207, 6, 711/E12.067; 326/38, 47; 345/568; 714/39
See application file for complete search history.

(56) References Cited

U.S. PATENT DOCUMENTS 5,581,722 A    12/1996  Welland
6,633,963 B1 *  10/2003  Ellison et al. .................. 711/163
(Continued)

FOREIGN PATENT DOCUMENTS

TW    I275102 B     3/2007
WO    2006099633 A2   9/2006
WO    2011156021 A2  12/2011

OTHER PUBLICATIONS

Barr et el, "SpecTLB: A Mechanism for Speculative Address Translation", ISCA San Jose California, USA, Jun. 4-8, 2011, pp. 307-317.*

(Continued)

*Primary Examiner* — Kevin Verbrugge
*Assistant Examiner* — Kamal Dewan
(74) *Attorney, Agent, or Firm* — Smith Tempel

(57) ABSTRACT

A security apparatus and method are provided for performing a security algorithm that prevents unauthorized access to contents of a physical address (PA) that have been loaded into a storage element of the computer system as a result of performing a prediction algorithm during a hardware table walk that uses a predictor to predict a PA based on a virtual address (VA). When the predictor is enabled, it might be possible for a person with knowledge of the system to configure the predictor to cause contents stored at a PA of a secure portion of the main memory to be loaded into a register in the TLB. In this way, a person who should not have access to contents stored in secure portions of the main memory could indirectly gain unauthorized access to those contents. The apparatus and method prevent such unauthorized access to the contents by masking the contents under certain conditions.

19 Claims, 8 Drawing Sheets

(51) Int. Cl.
    *G06F 21/79*      (2013.01)
    *G06F 12/10*      (2016.01)

(56) References Cited

U.S. PATENT DOCUMENTS

| | | | |
|---|---|---|---|
| 6,745,306 B1* | 6/2004 | Willman et al. | 711/163 |
| 7,089,377 B1* | 8/2006 | Chen | G06F 12/109 |
| | | | 703/27 |
| 7,089,397 B1 | 8/2006 | Anvin et al. | |
| 7,117,290 B2 | 10/2006 | Shen et al. | |
| 7,124,170 B1 | 10/2006 | Sibert | |
| 7,124,274 B2 | 10/2006 | Watt et al. | |
| 7,366,869 B2 | 4/2008 | Sartorius et al. | |
| 7,386,669 B2 | 6/2008 | Dombrowski et al. | |
| 7,434,027 B2 | 10/2008 | Morrow et al. | |
| 7,822,941 B2 | 10/2010 | Vick et al. | |
| 7,934,036 B2 | 4/2011 | Conti et al. | |
| 8,051,301 B2 | 11/2011 | Barnes et al. | |
| 8,108,641 B2 | 1/2012 | Goss et al. | |
| 8,595,465 B1 | 11/2013 | Raz | |
| 8,615,643 B2 | 12/2013 | Cohen et al. | |
| 2003/0079103 A1 | 4/2003 | Morrow | |
| 2003/0093686 A1* | 5/2003 | Barnes et al. | 713/200 |
| 2004/0148480 A1* | 7/2004 | Watt et al. | 711/163 |
| 2005/0125628 A1 | 6/2005 | Morrow et al. | |
| 2006/0075285 A1 | 4/2006 | Madukkarumukumana et al. | |
| 2006/0206687 A1 | 9/2006 | Vega et al. | |
| 2006/0224815 A1 | 10/2006 | Yamada et al. | |
| 2007/0226795 A1 | 9/2007 | Conti et al. | |
| 2007/0283123 A1* | 12/2007 | Vick et al. | 711/207 |
| 2012/0066474 A1* | 3/2012 | Funk | G06F 12/1027 |
| | | | 711/207 |
| 2012/0117301 A1 | 5/2012 | Wingard | |
| 2012/0226888 A1 | 9/2012 | Rychlik et al. | |
| 2013/0103923 A1 | 4/2013 | Pan | |
| 2014/0230077 A1* | 8/2014 | Muff | G06F 9/45533 |
| | | | 726/30 |
| 2014/0258586 A1 | 9/2014 | Zeng | |

OTHER PUBLICATIONS

Ahn J., et al., "Revisiting hardware-assisted page walks for virtualized systems", Computer Architecture (ISCA). 2012 39th Annual International Symposium on, IEEE, Jun. 9, 2012, XP032200057, DOI: 10.1109/ISCA.2012.6237041, ISBN: 978-1-4673-0475-7, pp. 476-487.

Basu A., et al., "Efficient virtual memory for big memory servers", Computer Architecture, ACM, 2 Penn Plaza, Suite 701 New York NY 10121-0701 USA, Jun. 23, 2013, XP058021243, DOI: 10.1145/2485922.2485943, ISBN: 978-1-4503-2079-5, pp. 237-248.

Hoang G., et al., "A Case for Alternative Nested Paging Models for Virtualized Systems", IEEE Computer Architecture Letters, IEEE, US, vol. 9, No. 1, Jan. 1, 2010, XP011329026, ISSN: 1556-6056, DOI: 10.1109/L-CA.2010.6, pp. 17-20.

International Search Report and Written Opinion—PCT/US2014/020185—ISA/EPO—Aug. 5, 2014.

Lanier T., "Exploring the Design of the Cortex-A15 Processor—ARM's next generation mobile applications processor", 2011, ARM, pp. 1-33. Retrieved on Oct. 1, 2014 from.

\* cited by examiner

METHOD AND APPARATUS FOR PREVENTING UNAUTHORIZED ACCESS TO CONTENTS OF A REGISTER UNDER CERTAIN CONDITIONS WHEN PERFORMING A HARDWARE TABLE WALK (HWTW)

TECHNICAL FIELD OF THE INVENTION

The invention relates to computer systems, and more particularly, to a method and apparatus for preventing, under certain conditions, unauthorized access to contents of a physical memory address that have been loaded into a register during a hardware table walk (HWTW).

BACKGROUND OF THE INVENTION

Modern computer systems use memory management units (MMUs) to manage writing data to and reading data from one or more physical memory devices, such as solid state memory devices, for example. The MMU of a computer system provides a virtual memory to the central processing unit (CPU) of the computer system that allows the CPU to run each application program in its own dedicated, contiguous virtual memory address space rather than having all of the application programs share the physical memory address space, which is often fragmented, or non-contiguous. The purpose of the MMU is to translate virtual memory addresses (VAs) into physical memory addresses (PAs) for the CPU. The CPU indirectly reads and writes PAs by directly reading and writing VAs to the MMU, which translates them into PAs and then writes or reads the PAs.

In order to perform the translations, the MMU accesses page tables stored in the system main memory. The page tables are made up of page table entries. The page table entries are information that is used by the MMU to map the VAs into PAs. The MMU typically includes a translation lookaside buffer (TLB), which is a cache memory element used to cache recently used mappings. When the MMU needs to translate a VA into a PA, the MMU first checks the TLB to determine whether there is a match for the VA. If so, the MMU uses the mapping found in the TLB to compute the PA and then accesses the PA (i.e., reads or writes the PA). This is known as a TLB "hit." If the MMU does not find a match in the TLB, this is known as a TLB "miss."

In the event of a TLB miss, the MMU performs what is known as a hardware table walk (HWTW). A HWTW is a time-consuming and computationally-expensive process that involves performing a "table walk" to find the corresponding page table in the MMU and then reading multiple locations in the page table to find the corresponding VA-to-PA address mapping. The MMU then uses the mapping to compute the corresponding PA and writes the mapping back to the TLB.

In computer systems that implement operating system (OS) virtualization, a virtual memory monitor (VMM), also commonly referred to as a hypervisor, is interposed between the hardware of the computer system and the system OS of the computer system. The hypervisor executes in privileged mode and is capable of hosting one or more guest high-level OSs. In such systems, application programs running on the OSs use VAs of a first layer of virtual memory to address memory, and the OSs running on the hypervisor use intermediate physical addresses (IPAs) of a second layer of virtual memory to address memory. In the MMU, stage 1 (S1) translations are performed to translate each VA into an IPA and stage 2 (S2) translations are performed to translate each IPA into a PA.

If a TLB miss occurs when performing such translations, a multi-level, two-dimensional (2-D) HWTW is performed to obtain the table entries that are needed to compute the corresponding IPA and PA. Performing these multi-level, 2-D HWTWs can result in a significant amount of computational overhead for the MMU, which typically results in performance penalties.

FIG. 1 is a pictorial illustration of a known three-level, 2-D HWTW that is performed when a TLB miss occurs while performing a read transaction. The HWTW shown in FIG. 1 represents a worst case scenario for a three-level, 2-D HWTW that requires the performance of fifteen table lookups to obtain the PA where the data is stored in physical memory. For this example, the MMU of the computer system is running a hypervisor that is hosting at least one guest high-level OS (HLOS), which, in turn, is running at least one application program. In such a configuration, the memory that is being allocated by the guest HLOS is not the actual physical memory of the system, but instead is the aforementioned intermediate physical memory. The hypervisor allocates actual physical memory. Therefore, each VA is translated into an IPA, which is then translated into a PA of the actual physical memory where the data being read is actually stored.

The process begins with the MMU receiving a S1 page global directory (PGD) IPA 2. For this worst case scenario example, it will be assumed that a TLB miss occurs when the MMU checks the TLB for a match. Because of the miss, the MMU must perform a HWTW. The HWTW involves performing three S2 table lookups 3, 4 and 5 to obtain the mapping needed to convert the IPA 2 into a PA and one additional lookup 6 to read the PA. The table lookups 3, 4 and 5 involve reading the S2 PGD, page middle directory (PMD) and page table entry (PTE), respectively. Reading the PA at lookup 6 provides the MMU with a S1 PMD IPA 7. For this worst case scenario example, it will be assumed that a TLB miss occurs when the MMU checks the TLB for a match with the S1 PMD IPA 7. Because of the miss, the MMU must perform another HWTW. The HWTW involves performing three S2 table lookups 8, 9 and 11 to obtain the mapping needed to convert the S1 PMD IPA 7 into a PA and one additional lookup 12 to read the PA. The table lookups 8, 9 and 11 involve reading the S2 PGD, PMD and PTE, respectively. Reading the PA at lookup 12 provides the MMU with a S1 PTE IPA 13.

For this worst case scenario example, it will be assumed that a TLB miss occurs when the MMU checks the TLB for a match with the S1 PTE IPA 13. Because of the miss, the MMU must perform another HWTW. The HWTW involves performing three S2 table lookups 14, 15 and 16 to obtain the mapping needed to convert the S1 PTE IPA 13 into a PA and one additional lookup 17 to read the PA. The table lookups 14, 15 and 16 involve reading the S2 PGD, PMD and PTE, respectively. Reading the PA at lookup 17 provides the MMU with the actual IPA 18. For this worst case scenario example, it will be assumed that a TLB miss occurs when the MMU checks the TLB for a match with the actual IPA 18. Because of the miss, the MMU must perform another HWTW. The HWTW involves performing three S2 table lookups 19, 21 and 22 to obtain the mapping needed to convert the actual IPA 18 into a PA. The table lookups 19, 21 and 22 involve reading the S2 PGD, PMD and PTE, respectively. The PA is then read to obtain the corresponding read data. Reading the PA at lookup 18 provides the MMU with a S1 PTE IPA 13.

Thus, it can be seen that in the worst case scenario for a three-level, 2-D HWTW, twelve S2 table lookups and three S1 table lookups are performed, which is a large amount of computational overhead that consumes are large amount of time and results in performance penalties. A variety of techniques and architectures have been used to reduce the amount of time and processing overhead that is involved in performing HWTWs, including, for example, increasing the size of the TLB, using multiple TLBs, using flat nested page tables, using shadow paging or speculative shadow paging, and using page walk cache. While all of these techniques and architectures are capable of reducing processing overhead associated with performing HWTWs, they often result in an increase in processing overhead somewhere else in the computer system.

Accordingly, a need exists for computer systems and methods that reduce the amount of time and computing resources that are required to perform a HWTW. A need also exists for a method and apparatus for preventing unauthorized access to contents of a PA that have been loaded into a TLB register during a HWTW.

SUMMARY OF THE INVENTION

The invention is directed to a security apparatus and method for preventing unauthorized access to contents of a PA that have been loaded into a storage element of a computer system during performance of a HWTW. The security apparatus and method detect certain conditions to determine whether access to the contents should be prevent, including detecting whether a prediction algorithm is being used to predict a VA based on the PA.

The apparatus comprises security logic configured to determine whether or not a prediction algorithm is currently enabled that predicts a PA as a function of an IPA if a miss occurred when checking the TLB for the contents of the PA. The security logic is configured to prevent the contents of the storage element from being accessed by a non-privileged entity while the prediction algorithm is currently enabled.

The method comprises:
providing security logic;
with the security logic, determining whether or not a prediction algorithm is currently enabled that predicts a PA as a function of an IPA if a miss occurred when checking a TLB for the contents of the PA; and
if the security logic determines that the prediction algorithm is currently enabled, the security logic prevents the contents of the storage element from being accessed by a non-privileged entity.

The invention is also directed to non-transitory computer-readable medium (CRM) having computer code stored thereon for execution by one or more processors of a computer system for preventing unauthorized access to contents of a PA that have been loaded into a storage element of the computer system during performance of a HWTW. The computer code comprises first and second computer code portions. The first computer code portion determines whether or not a prediction algorithm is currently enabled that predicts a PA as a function of an IPA if a miss occurred when checking a TLB for the contents of the PA. The second computer code portion prevents the contents of the storage element from being accessed by a non-privileged entity if the first computer code portion determines that the prediction algorithm is currently enabled.

These and other features and advantages will become apparent from the following description, drawings and claims.

DETAILED DESCRIPTION OF ILLUSTRATIVE EMBODIMENTS

In accordance with illustrative embodiments described herein, a computer system and a method for use in a computer system are provided for reducing the amount of time and computing resources that are required to perform a HWTW. If a TLB miss occurs when performing a S2 HWTW to find the PA at which a S1 page table is stored, the MMU performs a prediction algorithm that uses the IPA to predict the corresponding PA, thereby avoiding the need to perform any of the S2 table lookups. This greatly reduces the number of lookups that need to be performed when performing these types of HWTW read transaction, which greatly reduces processing overhead and performance penalties associated with performing these types of transactions.

In addition, illustrative embodiments of a security apparatus and method are provided for performing a security algorithm that prevents unauthorized access to contents of a PA that have been loaded into a storage element (e.g., a register of the TLB) as a result of the prediction algorithm is enabled. When the prediction algorithm is enabled, it might be possible for a person with knowledge of the system to configure the prediction algorithm to cause contents stored at a PA of a secure portion of the main memory to be loaded into a register in the TLB. In this way, a person who should not have access to contents stored in secure portions of the main memory could indirectly gain unauthorized access to those contents. The security apparatus and method prevent such unauthorized access from occurring by masking the contents under certain circumstances. Prior to describing the illustrative embodiments of the security apparatus and method, illustrative embodiments of the computer system and method for performing the prediction algorithm will be described with reference to FIGS. 2-6. Illustrative embodiments of the security apparatus and method will then be described with reference to FIGS. 7 and 8.

Figure 2:
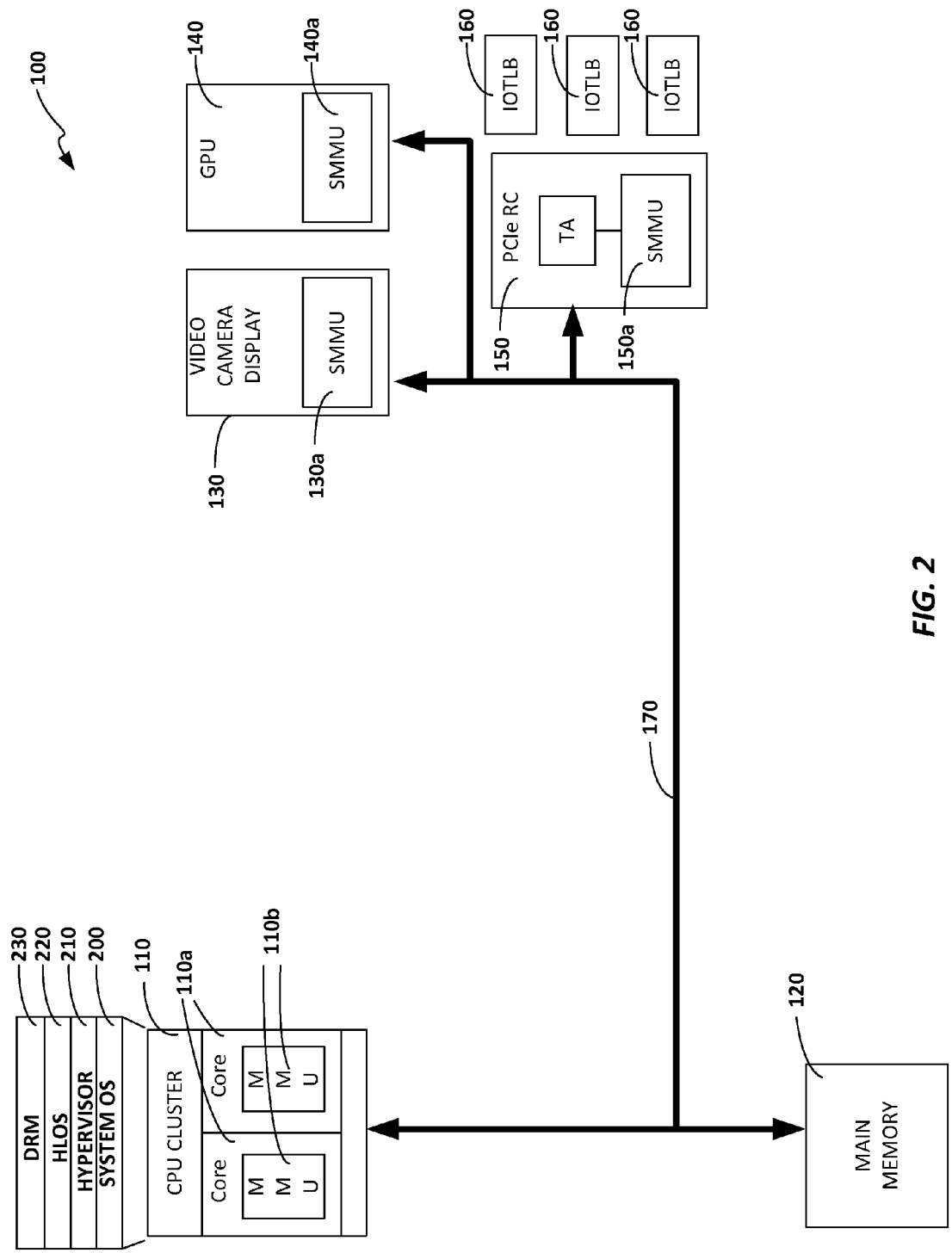
FIG. 2 illustrates a block diagram of a computer system in accordance with an illustrative, or exemplary, embodiment configured to perform the method for reducing the amount of time and computing resources that are required to perform a HWTW.

FIG. 2 illustrates a block diagram of a computer system 100 in accordance with an illustrative, or exemplary, embodiment configured to perform the method for reducing the amount of time and computing resources that are required to perform a S2 HWTW to find the PA at which a S1 page table is stored. The example of the computer system 100 shown in FIG. 2 includes a CPU cluster 110, a main memory 120, a video camera display 130, a graphical processing unit (GPU) 140, a peripheral connect interface express (PCIe) input/output (IO) device 150, a plurality of IO TLBs (IOTLBs) 160, and a system bus 170. The CPU cluster 110 has a plurality of CPU cores 110a, each of which has an MMU 110b. Each CPU core 110a may be a microprocessor or any other suitable processor. The video camera display 130 has a system MMU (SMMU) 130a. The GPU 140 has its own SMMU 140a. Likewise, the PCIe IO device 150 has its own SMMU 150a.

The MMUs 110b of the processor cores 110a are configured to perform the tasks of translating VAs into IPAs and translating IPAs into PAs. The page tables are stored in main memory 120. Each of the MMUs 110b and the SMMUs 130a, 140a and 150a has its own TLB (not shown for purposes of clarity) that store subsets of the page tables that are stored in main memory 120. In accordance with this illustrative embodiment, after the occurrence of a TLB miss, the MMUs 110b perform a prediction algorithm that processes an IPA to predict a PA. The prediction algorithm may be mathematically expressed as:

$$PA = f(IPA), \quad \text{(Equation 1)}$$

where f represents a mathematical function. The functions f that may be used for this purpose are described below in detail with reference to FIG. 5. The phrase "to predict," as that phrase is used herein, means "to determine," and does not imply a stochastic or probabilistic determination, although stochastic or probabilistic determinations are not necessarily excluded from the scope of the invention. The predictions that are made by the prediction algorithm are typically, but not necessarily, deterministic.

The CPU cluster 110 runs a system OS 200 and a virtual machine monitor (VMM), or hypervisor, 210. The hypervisor 210 manages the translation tasks, which includes, in addition to performing the translations, updating the page tables stored in the MMUs 110b and the SMMUs 130a, 140a and 150a. The hypervisor 210 also runs a guest HLOS 220 and/or a guest digital rights manager (DRM) 230. The HLOS 220 may be associated with the video camera display 130 and the DRM 230 may be associated with the GPU 140. The hypervisor 210 manages the HLOS 220 and the DRM 230.

After a TLB miss occurs, the hypervisor 210 configures the MMUs 110b and the SMMUs 130a, 140a and 150a to perform the prediction algorithm to convert the IPA into a PA. In such cases the starting IPA for the VA associated with the TLB miss is obtained from a hardware base register (not shown for purposes of clarity) of the CPU cluster 110 in the typical manner in which an S1 translation normally begins. The prediction algorithm then predicts the PA in accordance with Equation 1, as will be described below in more detail. To manage and update the SMMUs 130a, 140a and 150a, the CPU MMU 110b sends distributed virtual memory (DVM) messages over the bus 170 to the SMMUs 130a, 140a, and 150a. The MMUs 110b and the SMMUs 130a, 140a and 150a access main memory 120 to perform HWTWs.

In accordance with an illustrative embodiment, the CPU MMU 110b classifies MMU traffic into three transaction classes, namely: (1) S2 HWTW read transactions to find the PA at which a S1 page table is stored; (2) Client transactions; and (3) address fault (AF)/dirty flag write transactions. In accordance with this illustrative embodiment, the prediction algorithm only converts IPAs into PAs for class 1 transactions, i.e., HWTW read transactions. For all other classes of transactions, in accordance with this illustrative embodiment, the MMUs 110b and SMMUs 130a, 140a and 150a performs all other translations (e.g., S1 and client transaction S2 translations) in the typical manner.

Figure 3:
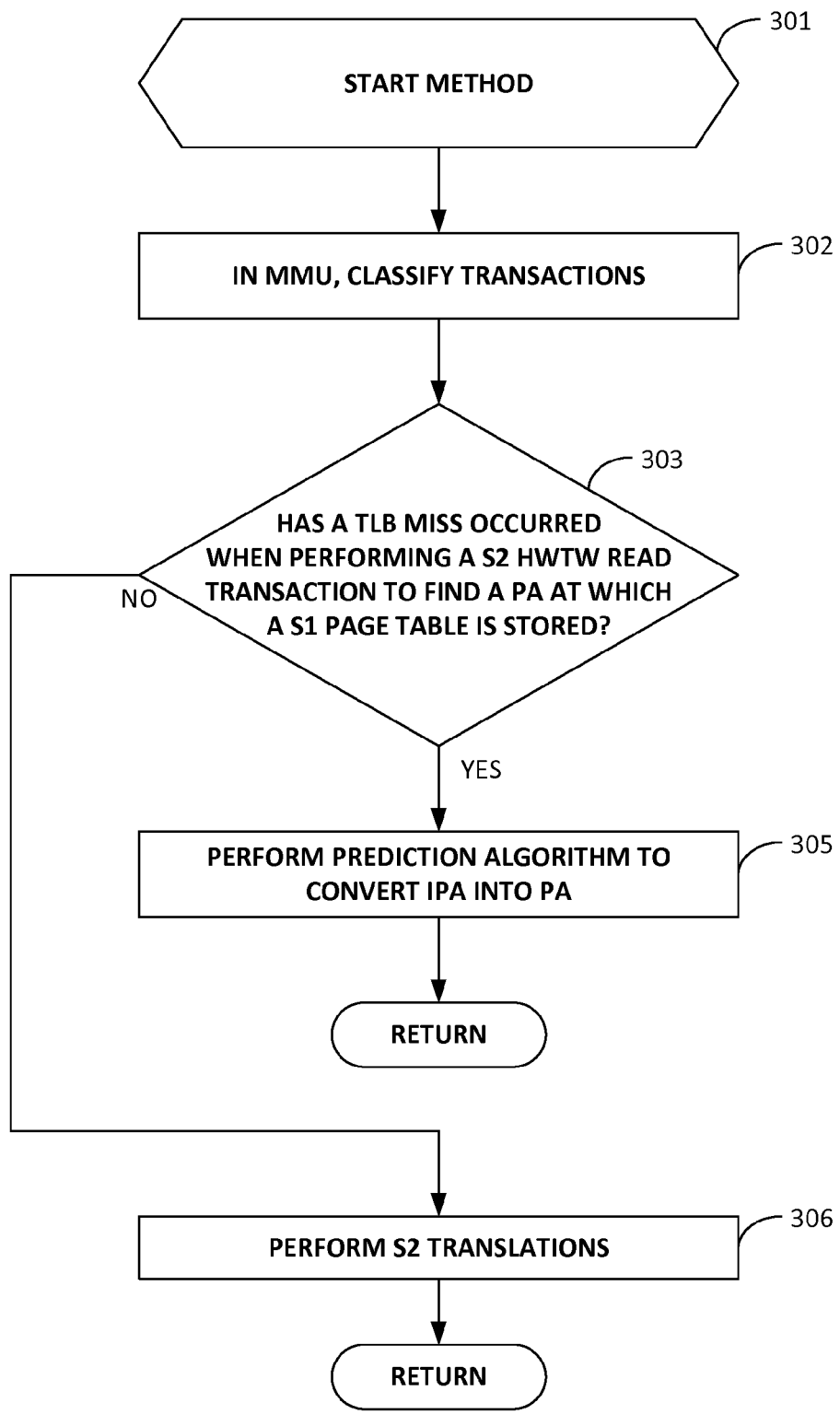
FIG. 3 is a flow diagram that represents the method, in accordance with an illustrative embodiment, performed by the hypervisor shown in FIG. 2 to reduce the amount of time and processing overhead that is required to perform a HWTW read transaction.

FIG. 3 is a flowchart that represents the method, in accordance with an illustrative embodiment, performed by the CPU MMU 110b to reduce the amount of time and processing overhead that is required to perform a HWTW read transaction. Block 301 represents the method starting, which typically occurs when the CPU cluster 110 boots up and begins running the system OS 200 and the hypervisor 210. The MMUs 110b classify traffic into the aforementioned transaction classes (1), (2) and (3), as indicated by block 302. The classification process may classify transactions into more or less than these three classes, but at least one of the classifications will be class (1) transactions, i.e., S2 HWTW read transactions to find the PA at which a S1 page table is stored. At the step represented by block 303, a determination is made as to whether a TLB miss has occurred when performing a class (1) transaction. If not, the method proceeds to block 306, at which the MMU 110b or SMMU 130a, 140a or 150a perform a HWTW in the normal manner.

If, at the step represented by block 303, the CPU MMU 110b determines that the miss occurred when performing a class (1) transaction, then the method proceeds to the step represented by block 305. At the step represented by block 305, the aforementioned prediction algorithm is performed to convert or translate the IPA into a PA.

Figure 4:
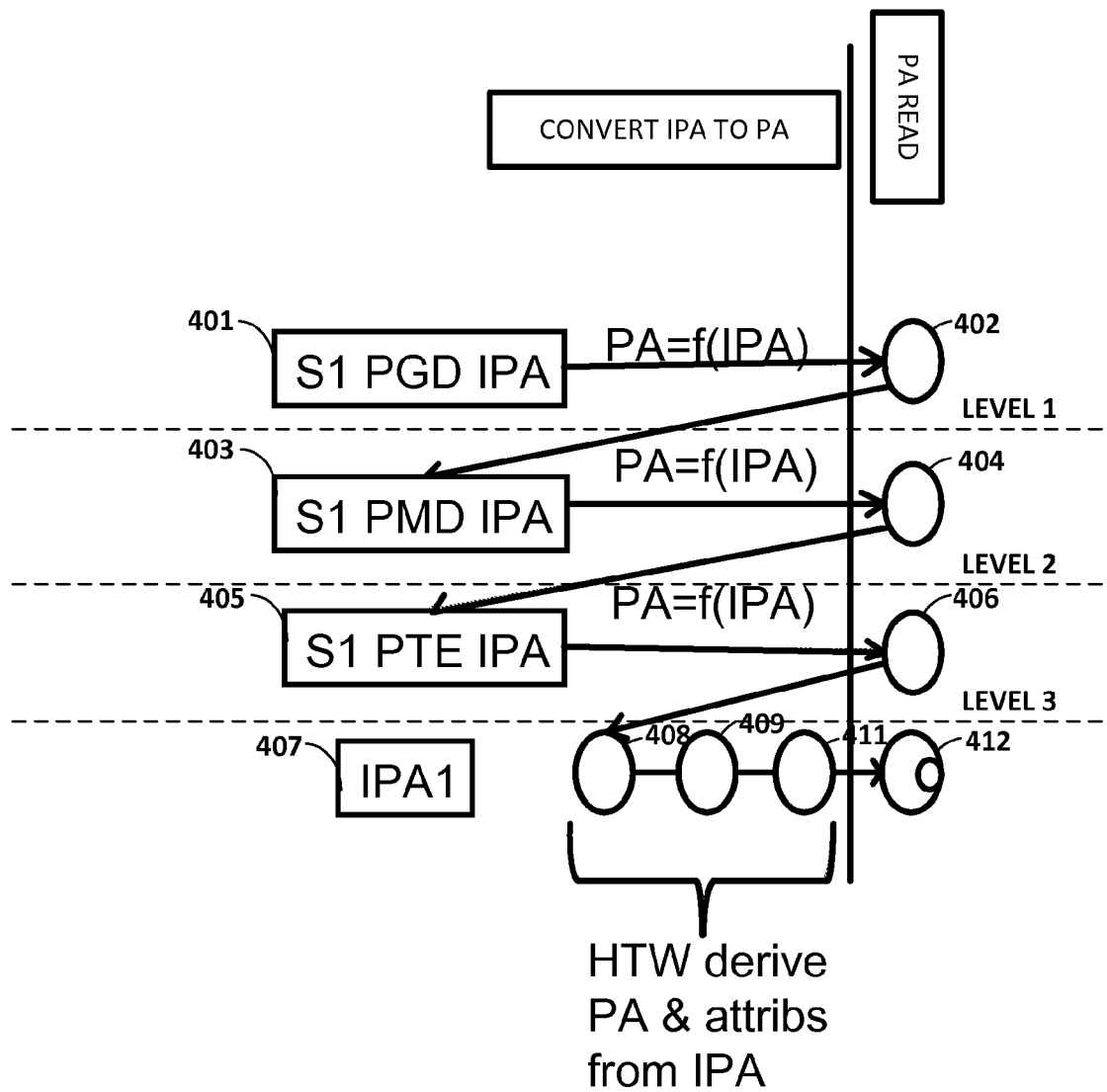
FIG. 4 is a pictorial diagram that demonstrates the manner in which a HWTW read transaction is performed using the method represented by the flowchart shown in FIG. 3 in accordance with an illustrative embodiment.

FIG. 4 is a pictorial diagram that demonstrates the manner in which a HWTW read transaction is performed in accordance with an illustrative embodiment. For this illustrative embodiment, it is assumed, for exemplary purposes, that the page tables are three-level page tables and that HWTWs are 2-D HWTWs. The example also assumes a TLB miss worst case scenario. The process begins with the MMU receiving a VA and then retrieving S1 PGD IPA 401 from a control register (not shown for purposes of clarity). The MMU then checks the TLB for a match with S1 PGD IPA 401. For this worst case scenario example, it will be assumed that a TLB miss occurs when the MMU checks the TLB for a match. Because of the miss, the MMU performs the prediction algorithm to convert S1 PGD IPA 401 into a PA 402 at which an S1 PMD IPA 403 is stored. Thus, a single lookup is used to convert S1 PGD IPA 401 into PA 402.

For this worst case scenario example, it will be assumed that a TLB miss occurs when the MMU checks the TLB for a match with the S1 PMD IPA 403. Because of the miss, the MMU performs the prediction algorithm to convert S1 PMD IPA 403 into a PA 404 at which S1 PTE IPA 405 is stored. Thus, a single lookup is used to convert S1 PMD IPA 403 into PA 404. For this worst case scenario example, it will be assumed that a TLB miss occurs when the MMU checks the TLB for a match with the S1 PTE IPA 405. Because of the miss, the MMU performs the prediction algorithm to convert S1 PTE IPA 405 into a PA 406 at which IPA1 407 is stored. Once IPA1 407 has been obtained, three lookups 408, 409 and 411 are performed to obtain the ultimate PA 412 where the data to be read is stored.

Figure 1:
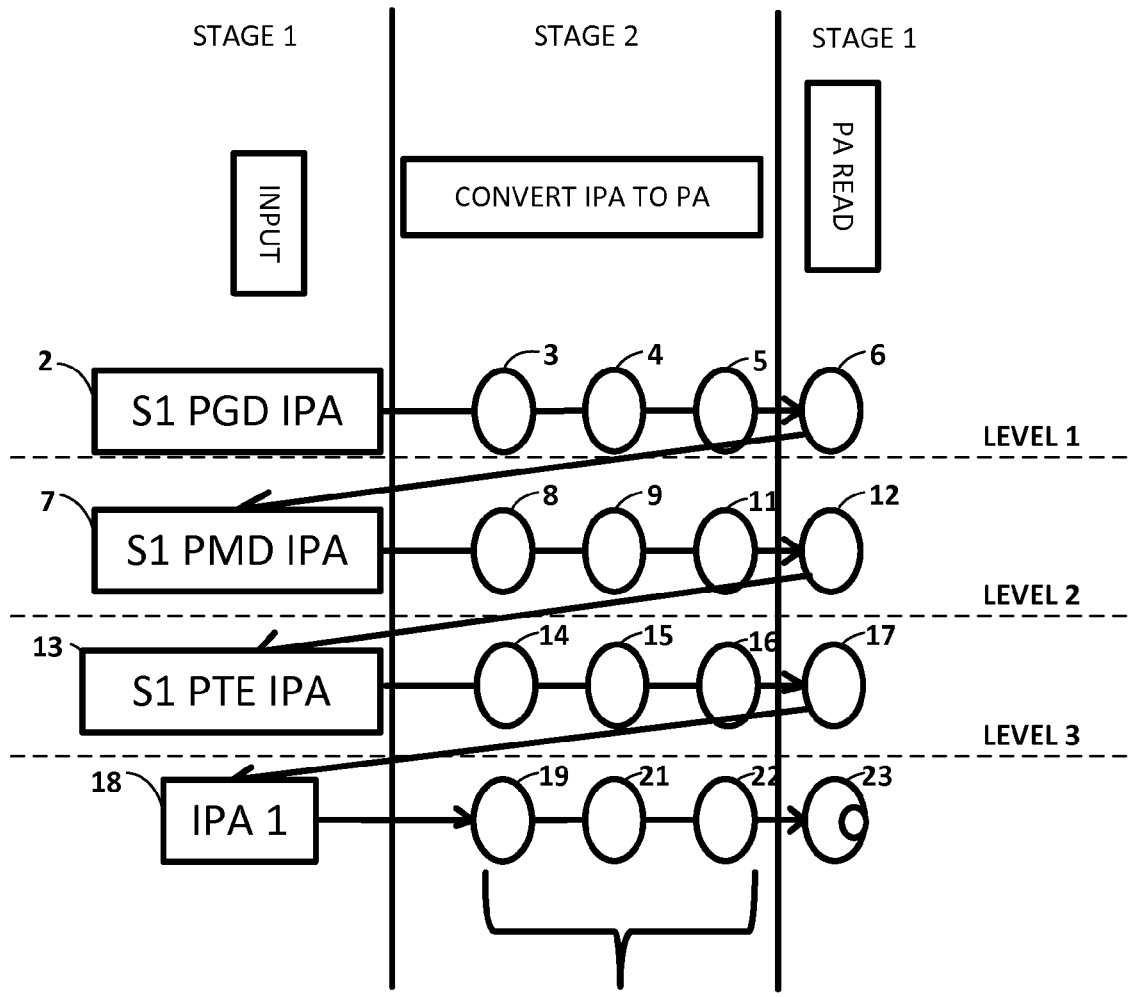
FIG. 1 is a block diagram of a computer system in accordance with an illustrative embodiment of the invention.

Thus, in accordance with this embodiment, it can be seen that the total number of lookups has been reduced from fifteen (FIG. 1) to six, which represents a 60% reduction in processing overhead. Of course, the invention is not limited to MMU configurations that have a particular number of levels or a particular number of HWTW dimensions. Those skilled in the art will understand that the concepts and principles of the invention apply regardless of the configuration of the page tables. Also, although the method and system are being described herein with reference to IPA-to-PA conversion, they are equally applicable to direct VA-to-PA conversions in systems that do not use IPAs.

Figure 5:
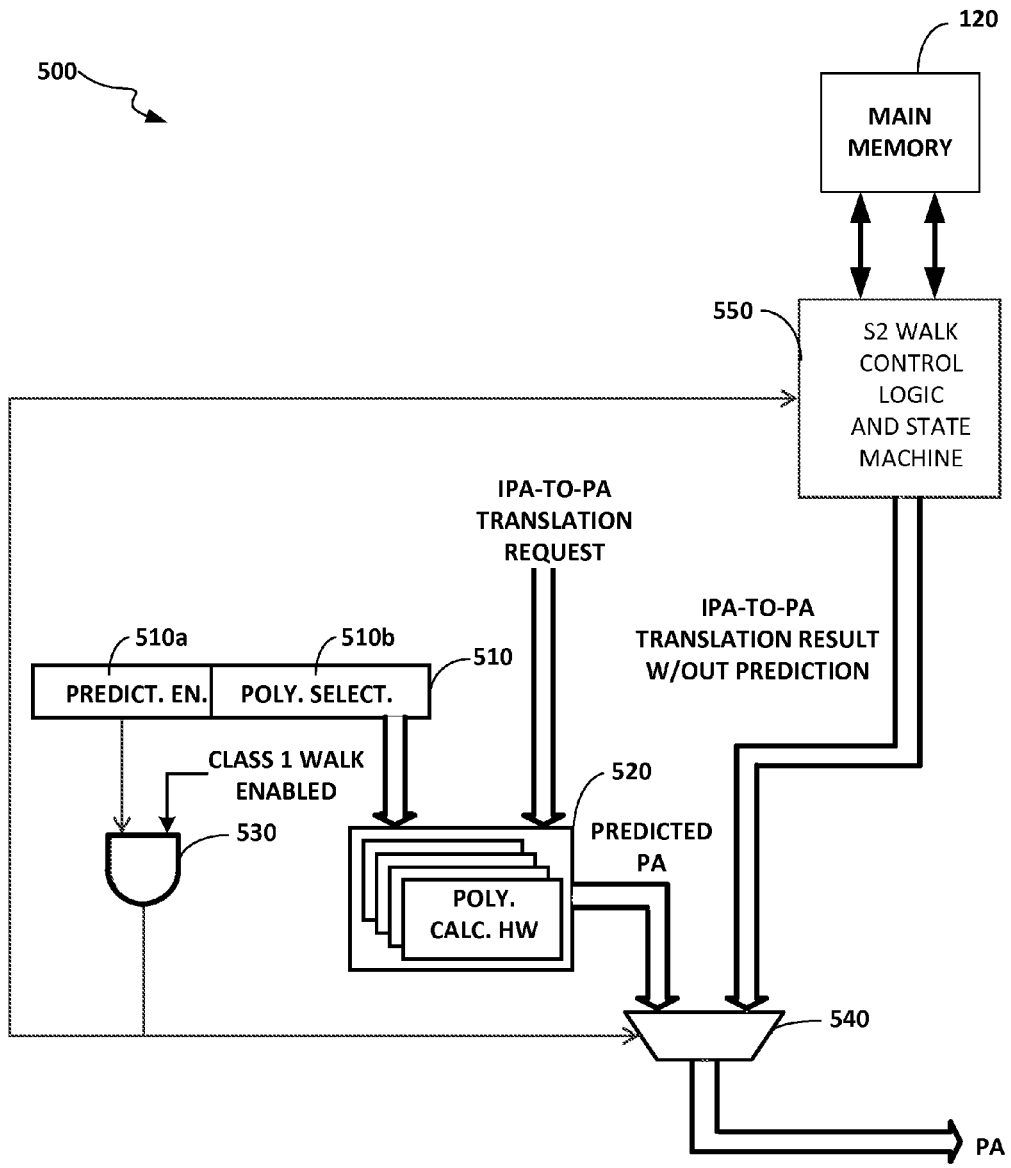
FIG. 5 is a block diagram of a hardware predictor in accordance with an illustrative embodiment that performs the method represented by the flowchart shown in FIG. 3.

FIG. 5 is a block diagram of an illustrative embodiment of a predictor 500 that performs the prediction algorithm. The predictor 500 is typically implemented in the MMUs 110b and in the SMMUs 130a, 140a and 150a. As indicated above, in accordance with the illustrative embodiment, the prediction algorithm is only performed when performing a class 1 read transaction. The configuration of the predictor 500 shown in FIG. 5 is an example of one configuration that allows the predictor 500 to be enabled for class 1 transactions and to be disabled for all other classes of transactions, including class 2 and 3 transactions.

The configuration of the predictor 500 shown in FIG. 5 also allows the predictor 500 to select the function, f, that is used in Equation 1 above to compute the PA based on the IPA. Each virtual machine (VM) may be using a different set of functions, f, so it is important that the sets of functions that are used ensure that there is a one-to-one mapping between IPA and PA over the range of IPA. The hypervisor 210 may be managing multiple HLOSs or DRMs, each of which will have a corresponding VM running in the hypervisor 210. The sets of functions that are used ensure that the predicted PA does not overlap a predicted PA allocated to another VM.

Examples of the function f are:

PA=IPA;

PA=IPA+Offset_function(VMID), where VMID is a unique identifier across all VMs that identifies the VM associated with the HWTW read transaction, and Offset_function is a function having an output that is selected based on a particular offset value associated with the VMID; and PA=IPA XOR Extended_VMID, where XOR represents and exclusive OR operation and Extended_VMID is an extended VMID. The hypervisor 210 selects the function f such that collisions between VMs are avoided.

In FIG. 5, it is assumed that the function f is a polynomial and that the hypervisor 210 selects a polynomial to be used as the function f from a plurality of polynomials. The polynomial that is selected may be based on, for example, the VMID of the VM for which the HWTW read transaction is being performed. A configuration register 510 of the predictor 500 holds one or more prediction enable bits 510a and one or more polynomial selection bits 510b. Polynomial calculation hardware 520 of the predictor 500 comprises hardware that selects a polynomial function based on the value of the polynomial selection bits 510b received from register 510. The polynomial calculation hardware 520 also receives an IPA-to-PA translation request and processes the request in accordance with the selected polynomial function to produce a predicted PA.

The prediction enable bit 510a and a class 1 enable bit are received at the inputs of an AND gate 530. The class 1 enable bit is asserted when a miss has occurred when performing a class 1 read transaction. A multiplexer (MUX) 540 of the predictor 500 receives the output of the AND gate 530 at a selector port of the MUX 540 and receives the predicted PA and the IPA-to-PA translation result obtained in the normal manner. When both the prediction enable bit 510a and the class 1 enable bit are asserted, the S2 WALK Control Logic And State Machine 550 is disabled and the MUX 540 selects the predicted PA to be output from the MUX 540.

When the prediction enable bit 510a and/or the class 1 enable bit is deasserted, the S2 Walk Control Logic And State Machine 550 is enabled. When the S2 Walk Control Logic And State Machine 550 is enabled, other types of S2 walks (e.g., class 2 and class 3) may be performed in main memory 120 by the S2 Walk Control Logic And State Machine 550. Thus, when the S2 Walk Control Logic And State Machine 550 is enabled, the MUX 540 outputs the IPA-to-PA translation result that is output from the S2 Walk Control Logic And State Machine 550.

It should be noted that the predictor 500 may have many different configurations. The configuration of the predictor 500 shown in FIG. 5 is merely one of many suitable configurations for performing the prediction algorithm. Persons of skill in that art will understand that many configurations other that shown in FIG. 5 may be used to perform the prediction algorithm.

Figure 6:
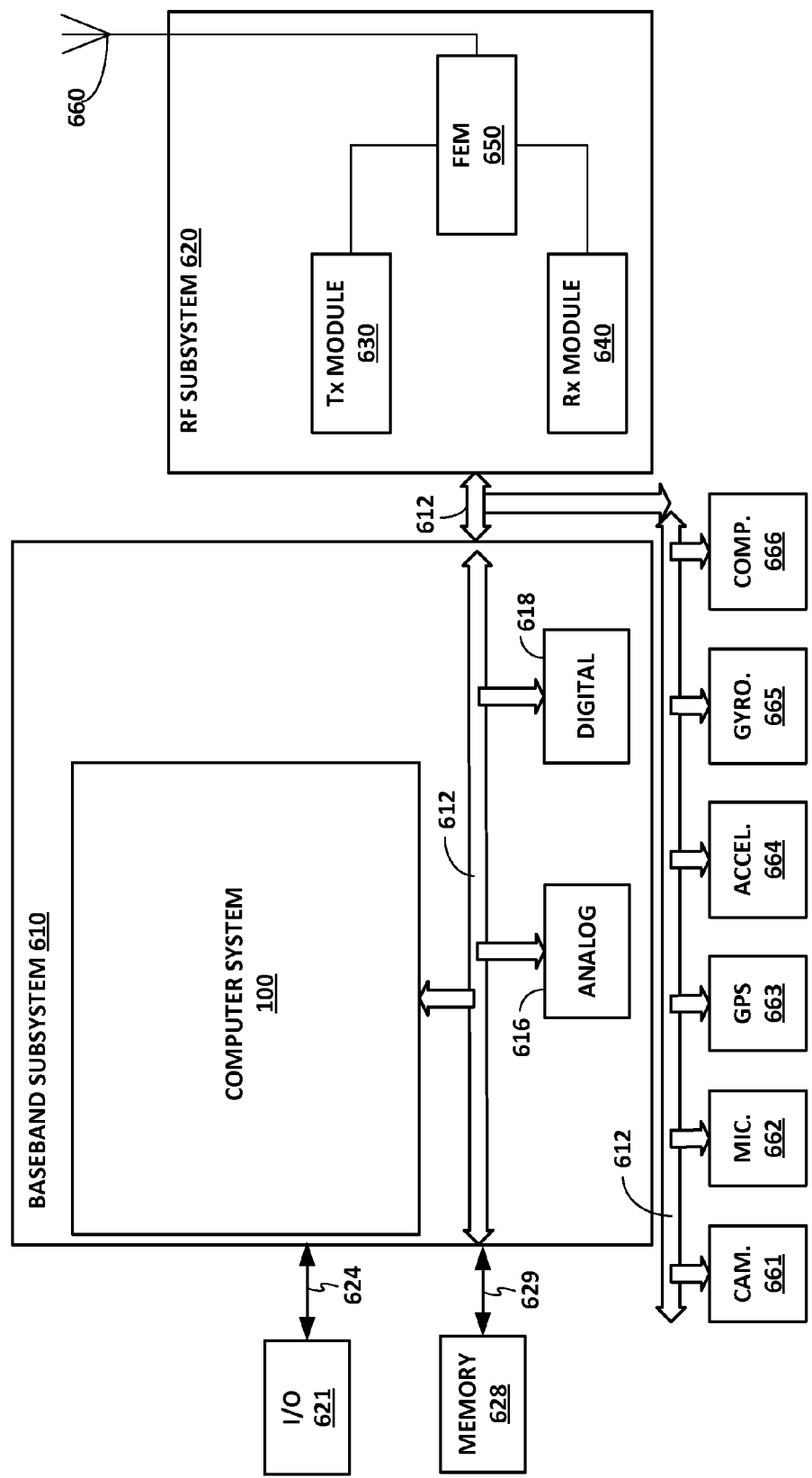
FIG. 6 illustrates a block diagram of a mobile smartphone in which the computer system shown in FIG. 2 is incorporated.

The computer system 100 shown in FIG. 2 may be implemented in any type of system in which memory virtualization is performed, including, for example, desktop computers, servers and mobile smartphones. FIG. 6 illustrates a block diagram of a mobile smartphone 600 in which the computer system 100 is incorporated. The smartphone 600 is not limited to being any particular type of smartphone or having any particular configuration, except that it must be capable of performing methods described herein. Also, the smartphone 600 illustrated in FIG. 6 is intended to be a simplified example of a cellular telephone having context awareness and processing capability for performing methods described herein. One having ordinary skill in the art will understand the operation and construction of a smartphone, and, as such, implementation details have been omitted.

In accordance with this illustrative embodiment, the smartphone 600 includes a baseband subsystem 610 and a radio frequency (RF) subsystem 620 connected together over a system bus 612. The system bus 612 typically comprises physical and logical connections that couple the above-described elements together and enable their interoperability. The RF subsystem 620 may be a wireless transceiver. Although details are not shown for clarity, the RF subsystem 620 generally includes a transmit (Tx) module 630 having modulation, upconversion and amplification circuitry for preparing a baseband information signal for transmission, includes a receive (Rx) module 640 having amplification, filtering and downconversion circuitry for receiving and downconverting an RF signal to a baseband information signal to recover data, and includes a front end module (FEM) 650 that includes diplexer circuitry, duplexer circuitry, or any other circuitry that can separate a transmit signal from a receive signal, as is known to those skilled in the art. An antenna 660 is connected to the FEM 650.

The baseband subsystem 610 generally includes the computer system 100, analog circuit elements 616, and digital circuit elements 618, electrically coupled together via the system bus 612. The system bus 612 typically comprises the physical and logical connections to couple the above-described elements together and enable their interoperability.

An input/output (I/O) element 621 is connected to the baseband subsystem 610 via connection 624. The I/O element 621 typically includes, for example, a microphone, a keypad, a speaker, a pointing device, user interface control elements, and any other devices or systems that allow a user to provide input commands and receive outputs from the smartphone 600. A memory 628 is connected to the baseband subsystem 610 via connection 629. The memory 628 may be any type of volatile or non-volatile memory. The memory 628 may be permanently installed in the smartphone 600, or may be a removable memory element, such as a removable memory card.

The analog circuitry 616 and the digital circuitry 618 include the signal processing, signal conversion, and logic that convert an input signal provided by the I/O element 621 to an information signal that is to be transmitted. Similarly, the analog circuitry 616 and the digital circuitry 618 include the signal processing elements used to generate an information signal that contains recovered information from a received signal. The digital circuitry 618 may include, for example, a digital signal processor (DSP), a field programmable gate array (FPGA), or any other processing device. Because the baseband subsystem 610 includes both analog and digital elements, it may be referred to as a mixed signal device (MSD).

The smartphone 600 may include one or more of a variety of sensors such as, for example, a camera 661, a microphone 662, a Global Positioning System (GPS) sensor 663, an accelerometer 665, a gyroscope 667, and a digital compass 668. These sensors communicate with the baseband subsystem 610 via bus 612.

Having the computer system 100 embedded in the smartphone 600 allows multiple OSs and multiple respective VMs to run on the smartphone 600. In this environment, the hypervisor 210 (FIG. 2) of the computer system 100 provides a secure separation between the hardware of the smartphone 600 and the application software being executed by the VMs.

In accordance with an illustrative embodiment, a security method and apparatus are provided that detect whether the prediction algorithm described above with reference to FIG. 5 is being performed, and if so, take security precautions that prevent the contents of certain registers and/or buffers from being accessible by non-privileged or unauthorized entities. The reason that this security method and apparatus are needed is because, when the prediction algorithm is enabled, it might be possible for a person with knowledge of the system to configure the prediction algorithm to cause contents stored at a PA of a secure portion of the physical main memory 120 (FIG. 2) to be loaded into a register in the TLB. In this way, a person who should not have access to contents stored in secure portions of the physical main memory 120 could indirectly gain unauthorized access to those PAs. The method and apparatus prevent such unauthorized or non-privileged access.

Figure 7:
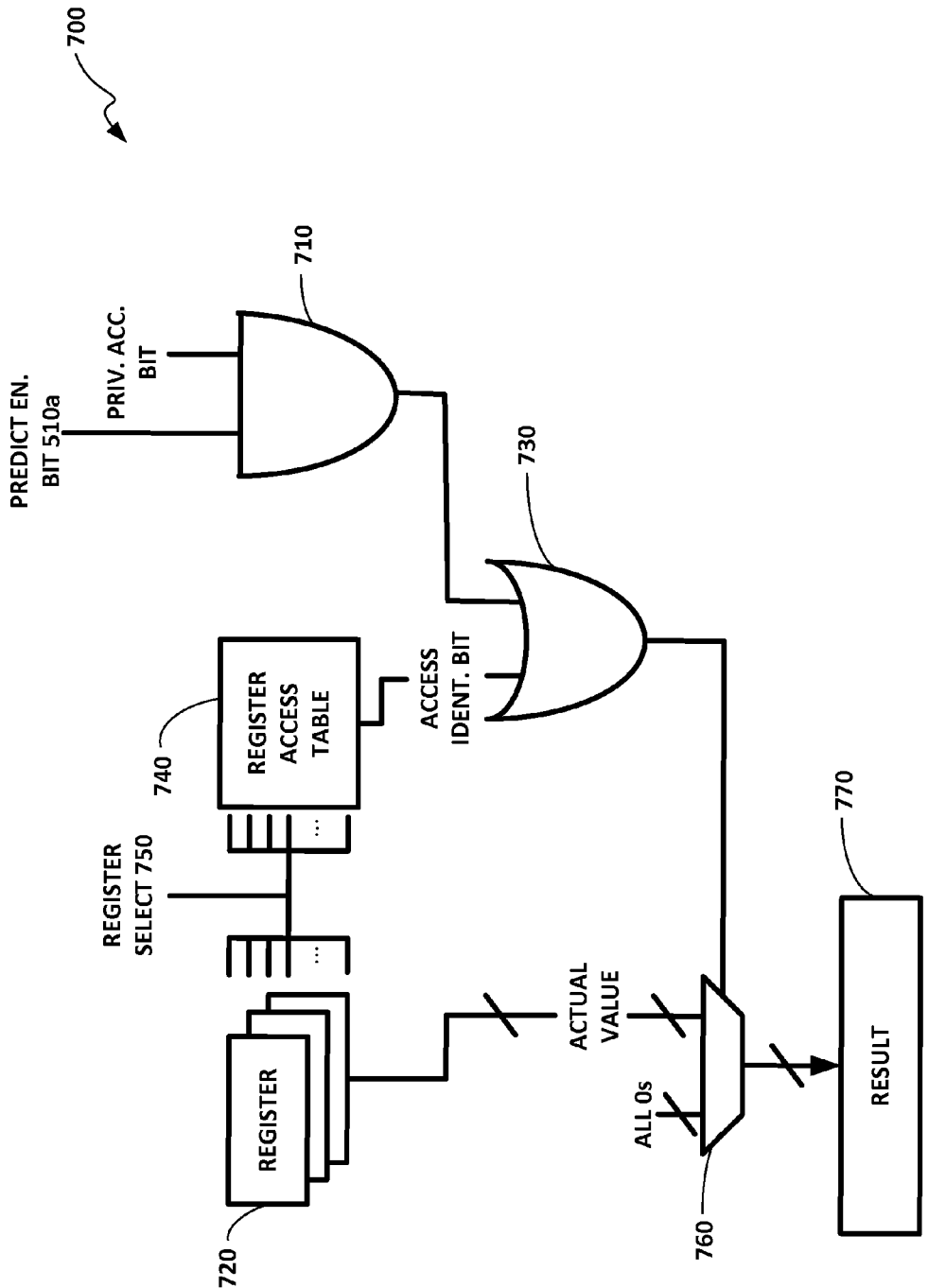
FIG. 7 is a block diagram of security logic in accordance with an illustrative embodiment for performing a security algorithm that prevents unauthorized access to contents of a PA that have been loaded into a register in a TLB while the predictor shown in FIG. 5 is enabled.

FIG. 7 is a block diagram of the apparatus 700 in accordance with an illustrative embodiment for performing a security algorithm that prevents unauthorized access to contents of a PA that have been loaded into a register in the TLB while the prediction algorithm is enabled. The block diagram is conceptual in nature and may be implemented solely in hardware or in a combination of hardware and software or firmware. The apparatus 700 is security logic configured to perform the security algorithm. The security logic 700 is typically part of the CPU core 110a and may be part of the MMUs 110b and SMMUs 130a, 140a and 150a (FIG. 2). The invention is not limited with regard to where in the computer system 100 the security logic 700 is located.

The predict enable bit 510a shown in FIG. 5 is connected to an input of an AND gate 710 of the security logic 700. A Privileged Access bit is applied to the other input of the AND gate 710. The Privileged Access bit is asserted if the entity attempting to access one of a plurality of registers 720 is privileged to access the particular register 720. For exemplary purposes, it will be assumed that the registers 720 are in the TLB. The output of AND gate 710 is applied to one of the inputs of an OR gate 730. An Access Identifier bit output from a Register Access Table 740 is applied to the other input of the OR gate 730. The Access Identifier bit is asserted if the register 720 being accessed contains the contents from a PA that is in a secured, or privileged, portion of the main memory 120 (FIG. 5). The Register Access Table 740 keeps track of which PAs are in secured portions of main memory 120 and asserts or deasserts the Access Identifier bits accordingly. A Register Select Address 750 that is used to select one of the registers 720 is also used to select a corresponding entry in the Register Address Table 740. Thus, if the register 720 selected by the Register Select Address 750 is privileged, the corresponding Access Identifier bit that is input to the OR gate 730 is asserted.

The output of the OR gate 730 is applied to a selector terminal of a MUX 760. The contents of the register 720 that is addressed by the Register Select Address 750 are applied to a first set of input terminals of the MUX 760. A second set of input terminals of the MUX 760 receives all logic 0s. When the prediction algorithm is enabled and the Privileged Access bit is asserted, the MUX 760 selects the contents of the register 720 addressed by the Register Select Address 750 to be output from the MUX 760 and loaded into a Result register 770. When the prediction algorithm is disabled, or the Privileged Access bit is deasserted, and the Access Identifier bit is deasserted (indicating that the contents being accessed are from a non-secure portion of main memory 120), the MUX 760 selects the contents of the register 720 addressed by the Register Select Address 750 to be output from the MUX 760 and loaded into the Result register 770. When the Access Identifier bit is asserted (indicating that the contents being accessed are from a secure portion of main memory 120), the MUX 760 selects all logic 0s to be output from the MUX 760 and loaded into the Result register 770.

Thus, the actual contents of the register 720 that is addressed by the Register Select Address 750 will be output from the MUX 760 and loaded into the Results register 770 except in the case where the Access Identifier bit is asserted. In this case, all logic 0s are loaded into the Result register 770 to prevent the actual content of the register 720 from being accessible in Result register 770.

Figure 8:
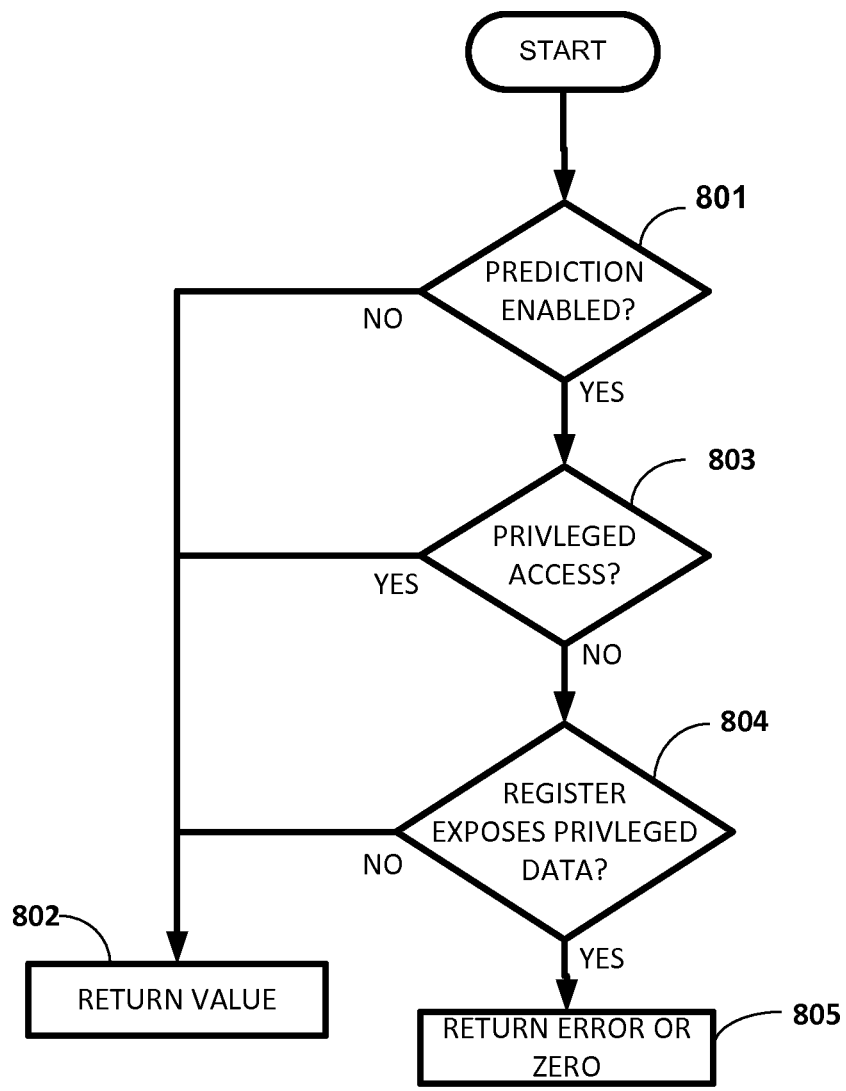
FIG. 8 is a flow diagram depicting the process performed by the security logic shown in FIG. 7 in accordance with an illustrative embodiment.

FIG. 8 is a flow diagram depicting the decision process performed by the security logic 700 described above with reference to FIG. 7. A determination is made at block 801 as to whether or not the prediction algorithm is enabled. If not, the actual contents of the register 720 are returned, as indicated by block 802. If so, then a determination is made at block 803 as to whether or not the entity attempting to access the contents is privileged. If so, the actual contents of the register 720 are returned at block 802. If not, a determination is made at block 804 as to whether or not the register 720 exposes privileged data. If not, the actual contents of the register 720 are returned at block 802. If so, logic 0s are returned, as indicated by block 805.

It can be seen from the description of the security logic 700 that if an unprivileged entity (e.g., an entity other than the hypervisor) attempts to use the predictor 500 shown in FIG. 5 to obtain unauthorized access to contents stored in an unauthorized PA of main memory 120, the actual contents will be overwritten with 0s to prevent the unauthorized or unprivileged entity from accessing the actual contents. Many modifications may be made to the security logic 700 shown in FIG. 7 and to the process shown in FIG. 8 within the scope of the invention. For example, with reference to FIG. 8, the process could be modified by eliminating block 803, leaving blocks 801, 802, 804, and 805. Alternatively, block 804 could be eliminated, leaving blocks 801, 802, 803, and 805. The security logic 700 shown in FIG. 7 could be easily modified to achieve the modified processes, as will be understood by those of skill in the art.

It should be noted that security functions other than, or in addition to, those described above with reference to FIGS. 5, 7 and 8 may also be implemented when an unauthorized access attempt has been detected. Overwriting the contents of the register with logic 0s is merely an example of one way of providing security. Examples of alternatives include overwriting the contents with logic 1s or some other binary value that obscures the true contents, XORing the contents with some other binary value of equal length, returning an error message instead of the actual contents, issuing an interrupt, resetting the processor 110a, the MMU 110, or the SMMU 130a, 140a or 150a, etc. Persons of skill in the art will understand the manner in which these and other suitable alternatives to the illustrative embodiment described herein may be implemented in view of the discussion being provided herein.

The processes described above with reference to FIGS. 3 and 8 may be implemented solely in hardware or in a combination of hardware and software or hardware and firmware. Likewise, many of the components of the computer system 100 shown in FIG. 2 may be implemented solely in hardware or in a combination of hardware and software or firmware. For example, the hypervisor 210 may be implemented solely in hardware or in a combination of hardware and software or firmware. In cases where the processes shown in FIGS. 3 and 8 or a component of the computer system 100 shown in FIG. 2 is implemented in software or firmware, the corresponding code is stored in the main memory 120 (FIG. 2), which is a computer-readable medium. The main memory 120 is typically a solid state computer-readable medium, such as a non-volatile random access memory (RAM), dynamic RAM (DRAM), read only memory (ROM) device, programmable ROM (PROM), erasable PROM (EPROM), etc. However, other types of computer-readable mediums may be used for storing the code, such as, for example, magnetic and optical storage devices.

It should be noted that the illustrative embodiments described herein are intended to demonstrate the principles and concepts of the invention. The invention is not limited to these embodiments, as will be understood by those of skill in the art in view of the description provided herein. It should also be noted that many variations may be made to the methods and systems described above with reference to FIGS. 2-8 without deviating from the scope of the invention. For example, the configuration of the security logic 700 shown in FIG. 7 may be modified in a number of ways while still achieving the goals described above, as will be understood by those of skill in the art in view of the description being provided herein. Also, the smartphone 600 shown in FIG. 6 is merely one example of a mobile device that has a suitable configuration and functionality for performing the method. Persons of skill in the art will understand, in view of the description provided herein, that many variations may be made to the smartphone 600 shown in FIG. 6 without deviating from the scope of the invention. These and other variations are within the scope of the invention.

What is claimed is:

1. An apparatus of a computer system for preventing unauthorized access to contents of a physical address (PA) that have been loaded into a storage element of the computer system during performance of a hardware table walk (HWTW), the apparatus comprising:
   a memory management unit (MMU) configured to perform a stage-1 (S1) translation of a virtual address (VA) into an Intermediate Physical Address (IPA) and to perform a stage-2 (S2) translation of the IPA into a PA, the MMU further configured to assert a prediction enable bit when a read transaction directs the MMU to perform the S2 translation of the IPA into the PA, the MMU further configured to assert a class enable bit when a miss results from performance of the read transaction when determining whether a translation lookaside buffer (TLB) indicates the PA at which an S1 page table is stored;
   a predictor configured to enable a prediction algorithm that predicts a physical address as a function of the IPA and a function of a virtual machine identifier, the predictor configured to disable HWTW control logic in response to the prediction enable bit and the class enable bit; and
   security logic configured to prevent the contents of said storage element from a secure portion of memory from being accessed by a non-privileged entity when the prediction algorithm is currently enabled by the prediction enable bit, and to allow the contents of said storage element from a non-secure portion of memory to be accessed by a non-privileged entity when the prediction algorithm is currently disabled by the prediction enable bit.

2. The apparatus of claim 1, wherein said storage element is a register of the TLB into which the contents of the predicted PA have been loaded if the prediction algorithm is currently enabled, and wherein the security logic comprises:
   first decision logic that determines when the prediction algorithm is currently enabled, and wherein the first decision logic also determines whether a privileged entity or a non-privileged entity is attempting to access the contents of the register, the first decision logic outputting a first decision if the first decision logic determines that the prediction algorithm is currently enabled and that a privileged entity is attempting to gain access to contents of the register, the first decision logic outputting a second decision if the first decision logic determines either that the prediction algorithm is not currently enabled or that a non-privileged entity is attempting to gain access to contents of the register; and
   selection logic configured to preserve the contents of the register if the first decision logic outputted the first decision.

3. The apparatus of claim 2, wherein the security logic further comprises:
   second decision logic configured to determine whether or not the PA corresponds to a secure or non-secure portion of main memory, wherein if the second decision logic determines that the PA corresponds to a secure portion of main memory, the second decision logic outputs a first decision whether or not the first decision logic outputted the first decision or the second decision, and wherein if the second decision logic determines that the PA corresponds to a non-secure portion of main memory or that the first decision logic outputted the second decision, the second decision logic outputs a second decision whether or not the first decision logic outputted the first decision or the second decision; and
   wherein the selection logic is configured to cause the contents of the register to be masked if the second decision logic outputted the first decision, and wherein the selection logic is configured to preserve the contents of the register if the second decision logic outputted the second decision.

4. The apparatus of claim 1, wherein the security logic is part of the MMU of the computer system.

5. The apparatus of claim 4, wherein the MMU is part of central processing unit (CPU) of the computer system.

6. The apparatus of claim 5, wherein the CPU is part of a CPU cluster of the computer system.

7. The apparatus of claim 1, wherein the computer system is part of a mobile phone.

8. A method performed in a computer system for preventing unauthorized access to contents of a physical address (PA) that have been loaded into a storage element of the computer system during performance of a hardware table walk (HWTW), the method comprising:
provided a memory management unit (MMU) configured to perform a stage-1 (S1) translation of a virtual address (VA) into an Intermediate Physical Address (IPA) and to perform a stage-2 (S2) translation of the IPA into a PA;
providing a predictor configured to enable a prediction algorithm when a memory management unit (MMU) receives a read transaction directing the MMU to perform the S2 translation of the IPA into the PA, the prediction algorithm identifying a physical address as a function of the IPA and a function of a virtual machine identifier, the predictor further configured to disable HWTW control logic in response to a miss result from performance of the read transaction when determining whether a translation lookaside buffer (TLB) indicates the PA at which an S1 page table is stored; and
providing security logic;
with the security logic, preventing the contents of said storage element from being accessed by a non-privileged entity when the prediction algorithm is currently enabled, and to allow the contents of said storage element to be accessed by a non-privileged entity when the prediction algorithm is currently disabled.

9. The method of claim 8, wherein said storage element is a register of the TLB into which the contents of the predicted PA have been loaded if the prediction algorithm is currently enabled, and wherein the method further comprises:
with first decision logic of the security logic determining when the prediction algorithm is currently enabled, and wherein the first decision logic also determines whether a privileged entity or a non-privileged entity is attempting to access the contents of the register;
with the first decision logic, outputting a first decision if the first decision logic determines that the prediction algorithm is currently enabled and that a privileged entity is attempting to gain access to contents of the register;
with the first decision logic, outputting a second decision if the first decision logic determines either that the prediction algorithm is not currently enabled or that a non-privileged entity is attempting to gain access to contents of the register;
with selection logic of the security logic, preserving the contents of the register if the first decision logic outputted the first decision.

10. The method of claim 9, further comprising:
with second decision logic of the security logic, determining whether or not the PA corresponds to a secure or non-secure portion of main memory;
with the second decision logic, outputting a first decision from the second decision logic if the second decision logic determines that the PA corresponds to a secure portion of main memory whether or not the first decision logic outputted the first decision or the second decision;
with the second decision logic, outputting a second decision from the second decision logic if the second decision logic determines that the PA corresponds to a non-secure portion of main memory or that the first decision logic outputted the second decision;
with the selection logic, causing the contents of the register to be masked if the second decision logic outputted the first decision; and
with the selection logic, causing the contents of the register to be preserved if the second decision logic outputted the second decision.

11. The method of claim 8, wherein the security logic is part of the MMU of the computer system.

12. The method of claim 11, wherein the MMU is part of central processing unit (CPU) of the computer system.

13. The method of claim 12, wherein the CPU is part of a CPU cluster of the computer system.

14. The method of claim 8, wherein the computer system is part of a mobile phone.

15. A non-transitory computer-readable medium (CRM) having computer code stored thereon for execution by one or more processors of a computer system for preventing unauthorized access to contents of a physical address (PA) that have been loaded into a storage element of the computer system during performance of a hardware table walk (HWTW), the computer code comprising:
code configured to perform a stage-1 (S1) translation of a virtual address (VA) into an Intermediate Physical Address (IPA) and to perform a stage-2 (S2) translation of the IPA into a PA, and further configured to enable a prediction algorithm when a memory management unit (MMU) receives a read transaction directing the MMU to perform the S2 translation of the IPA into the PA, the prediction algorithm identifying a physical address as a function of an intermediate physical address and a function of a virtual machine identifier, the code further configured to disable HWTW control logic in response to a miss result from performance of the read transaction when determining whether a translation lookaside buffer (TLB) indicates the PA at which an S1 page table is stored;
a first computer code portion for determining whether or not the prediction algorithm is currently enabled; and
a second computer code portion for preventing the contents of said storage element from being accessed by a non-privileged entity if the first computer code portion determines that the prediction algorithm is currently enabled and for allowing the contents of said storage element to be accessed by a non-privileged entity when the prediction algorithm is currently disabled.

16. The non-transitory CRM of claim 15, wherein said storage element is a register of the TLB into which the contents of the predicted PA have been loaded if the prediction algorithm is currently enabled, and wherein the first computer code portion also determines whether a privileged entity or a non-privileged entity is attempting to access the contents of the register, and wherein the first computer code portion outputs a first decision if the first computer code portion determines that the prediction algorithm is currently enabled and that a privileged entity is attempting to gain access to contents of the register, and wherein the first computer code portion outputs a second decision if the first computer code portion determines either that the prediction algorithm is not currently enabled or that a non-privileged entity is attempting to gain access to contents of the register, and wherein the second computer code portion causes the contents of the register to be preserved if the first computer code portion outputted the first decision.

17. The non-transitory CRM of claim 16, wherein the CRM is part of the MMU of the computer system.

18. The non-transitory CRM of claim 17, wherein the MMU is part of central processing unit (CPU) of the computer system.

19. The non-transitory CRM of claim 18, wherein the CPU is part of a CPU cluster of the computer system.

* * * * *